(12) United States Patent
Liu et al.

(10) Patent No.: US 11,467,445 B2
(45) Date of Patent: Oct. 11, 2022

(54) DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Hao Liu, Beijing (CN); Ruichen Zhang, Beijing (CN); Kaixuan Wang, Beijing (CN); Hongming Zhan, Beijing (CN); Xi Chen, Beijing (CN)

(73) Assignees: Beijing Boe Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/014,262

(22) Filed: Sep. 8, 2020

(65) Prior Publication Data
US 2021/0124194 A1   Apr. 29, 2021

(30) Foreign Application Priority Data

Oct. 23, 2019 (CN) .................. 201911012743.X

(51) Int. Cl.
*G02F 1/13357* (2006.01)
*G02F 1/1362* (2006.01)
*G02F 1/1335* (2006.01)

(52) U.S. Cl.
CPC ...... *G02F 1/1336* (2013.01); *G02F 1/133504* (2013.01); *G02F 1/133528* (2013.01); *G02F 1/136209* (2013.01); *G02F 1/136286* (2013.01); *G02F 1/133601* (2021.01); *G02F 2202/28* (2013.01)

(58) Field of Classification Search
CPC ............... G02F 1/1347; G02F 1/13471; G02F 1/13476; G02F 1/133607; G02F 1/133606; G02F 1/133602–1/133614; G02F 1/133601; G02F 1/136209;
(Continued)

(56) References Cited

U.S. PATENT DOCUMENTS 6,304,309 B1 * 10/2001 Yamanaka ........ G02F 1/133377
   349/156
2011/0075070 A1 * 3/2011 Kitagawa .......... G02F 1/133504
   349/64
(Continued)

*Primary Examiner* — Mariam Qureshi
(74) *Attorney, Agent, or Firm* — Leason Ellis LLP

(57) ABSTRACT

A display panel and a display device are disclosed. The display panel includes liquid crystal display panel, and a light control panel that are stacked; the liquid crystal display panel includes first mesh lines extending along a first direction and second mesh lines extending along a second direction intersecting with the first direction that define color subpixel units; the light control panel allows back light to be enter the liquid crystal display panel after passing through the light control panel, and includes first signal lines extending along the first direction and second signal lines extending along the second direction that define light control units; N color subpixel units continuously arranged and respectively displaying different colors constitute one pixel unit; N is a positive integer; along the first direction, a maximum length of one light control unit is m times a maximum length of one pixel unit; m is a non-integer.

20 Claims, 10 Drawing Sheets

(58) Field of Classification Search
CPC ......... G02F 1/133504; G02F 1/133528; G02F 1/136286; G02F 1/1336; G02B 6/005; G02B 6/0033–0063
See application file for complete search history.

(56) References Cited

U.S. PATENT DOCUMENTS

| 2011/0102718 | A1* | 5/2011 | Yoshihara | G02F 1/1347 |
| | | | | 349/113 |
| 2018/0120639 | A1* | 5/2018 | Shih | G02F 1/133504 |
| 2019/0317372 | A1* | 10/2019 | Tsai | G02F 1/13394 |
| 2020/0127011 | A1* | 4/2020 | Yamazaki | H01L 27/124 |

* cited by examiner

Display Image Of
Local Dimming

Brightness Of
Backlight Block

| $L_1/\mu m$ | 743.8 | 744 | 744.15 | 744.3 | 744.5 | 744.55 |
|---|---|---|---|---|---|---|
| $d=1.405\mu m$ Viewing Angle=45° | | | | | | |
| $d=1.405\mu m$ Viewing Angle=90° | | | | | | |

| $L_1/\mu m$ | 744.6 | 744.65 | 744.7 | 744.8 | 745 | 746 |
|---|---|---|---|---|---|---|
| $d=1.405\mu m$ Viewing Angle=45° | | | | | | |
| $d=1.405\mu m$ Viewing Angle=90° | | | | | | |

DISPLAY PANEL AND DISPLAY DEVICE

The present application claims priority to Chinese patent application No. 201911012743.X, filed on Oct. 23, 2019, the entire disclosure of which is incorporated herein by reference as part of the present application.

TECHNICAL FIELD

At least one embodiment of the present disclosure relates to a display panel and a display device.

BACKGROUND

In a display panel, it is easy to generate a rainbow stripe phenomenon, that is, the human eyes see color stripes, such as three mixed color stripes of magenta, yellow and cyan, which affects visual experience. Alleviating the rainbow stripe phenomenon is of great significance to the improvement of the display quality of the display panel.

SUMMARY

At least one embodiment of the present disclosure provides a display panel, and the display panel comprises a liquid crystal display panel, and a light control panel stacked with the liquid crystal display panel; the liquid crystal display panel comprises a plurality of mesh lines, the plurality of mesh lines comprise a plurality of first mesh lines extending along a first direction and a plurality of second mesh lines extending along a second direction, the first direction and the second direction intersect with each other, and the plurality of first mesh lines and the plurality of second mesh lines define a plurality of color subpixel units arranged in an array; the light control panel is configured to allow backlight to be incident into the liquid crystal display panel after passing through the light control panel, and the light control panel comprises a plurality of signal lines; the plurality of signal lines comprise a plurality of first signal lines extending along the first direction and a plurality of second signal lines extending along the second direction; the plurality of first signal lines and the plurality of second signal lines define a plurality of light control units arranged in an array; N color subpixel units which are continuously arranged along the first direction constitute one pixel unit, and N is a positive integer; the N color subpixel units respectively display different colors; and along the first direction, a maximum length of one light control unit of the plurality of light control units is m times a maximum length of one pixel unit, and m is a non-integer.

For example, in the display panel provided by an embodiment of the present disclosure, $2.00129 < m < 2.00157$.

For example, in the display panel provided by an embodiment of the present disclosure, $m = 2.00143$.

For example, in the display panel provided by an embodiment of the present disclosure, a size of the display panel is 65 inches, a resolution of the display panel is 4K, and along the first direction, the maximum length of one light control unit of the plurality of light control units is in a range of 744.0 μm-744.7 μm.

For example, in the display panel provided by an embodiment of the present disclosure, along the first direction, the maximum length of one light control unit of the plurality of light control units is 744.55 μm.

For example, in the display panel provided by an embodiment of the present disclosure, the size of the display panel is 75 inches, a resolution of the display panel is 4K, and along the first direction, the maximum length of one light control unit of the plurality of light control units is in a range of 859.5 μm-856.0 μm.

For example, in the display panel provided by an embodiment of the present disclosure, along the first direction, the maximum length of one light control unit of the plurality of light control units is 859.85 μm.

For example, in the display panel provided by an embodiment of the present disclosure, along the second direction, a maximum width of one light control unit of the plurality of light control units is n times a maximum width of one pixel unit, and n is a positive integer.

For example, in the display panel provided by an embodiment of the present disclosure, the liquid crystal display panel comprises: a first base substrate and a second base substrate; the second base substrate is opposite to the first base substrate and is on a side, away from the light control panel, of the first base substrate; the light control panel comprises: a third base substrate and a fourth base substrate; the fourth base substrate is on a side, away from the liquid crystal display panel, of the third base substrate; and a distance between a first surface, away from the light control panel, of the first base substrate and a first surface, away from the liquid crystal display panel, of the third base substrate is less than or equal to 1.7 mm.

For example, in the display panel provided by an embodiment of the present disclosure, the first base substrate and the third base substrate are an integral structure, the integral structure constitutes a common substrate, and the liquid crystal display panel and the light control panel share the common substrate.

For example, the display panel provided by an embodiment of the present disclosure further comprises an adhesion layer and a first polarizer. The adhesion layer is between the first base substrate and the third base substrate to bond the first base substrate and the third base substrate so that no air layer is between the first base substrate and the third base substrate; the first polarizer is on the first surface, away from the liquid crystal display panel, of the third base substrate, or on the first surface, away from the light control panel, of the first base substrate; the distance between the first surface of the first base substrate and the first surface of the third base substrate is equal to a sum of a thickness of the first base substrate in a direction perpendicular to the first surface of the first base substrate, a thickness of the third base substrate in the direction perpendicular to the first surface of the first base substrate, and a thickness of the adhesion layer in the direction perpendicular to the first surface of the first base substrate.

For example, in the display panel provided by an embodiment of the present disclosure, a refractive index of the adhesion layer is greater than a refractive index of the first base substrate and greater than a refractive index of the third base substrate.

For example, in the display panel provided by an embodiment of the present disclosure, a difference between the refractive index of the adhesion layer and the refractive index of the first base substrate is less than 0.3; and the difference between the refractive index of the adhesion layer and the refractive index of the third base substrate is less than 0.3.

For example, in the display panel provided by an embodiment of the present disclosure, both a line width of each first signal line of the plurality of first signal lines and a line width of each second signal line of the plurality of second signal lines are less than or equal to 30 μm.

For example, in the display panel provided by an embodiment of the present disclosure, the light control panel further comprises a first black matrix covering the plurality of first signal lines and the plurality of second signal lines, and a line width of the first black matrix is less than or equal to 30 μm.

For example, in the display panel provided by an embodiment of the present disclosure, at least a part of the plurality of first signal lines includes a fold line(s) and at least a part of the plurality of second signal lines includes a fold line(s); or at least a part of the plurality of first signal lines includes a fold line(s), and all the plurality of second signal lines are straight lines.

For example, in the display panel provided by an embodiment of the present disclosure, the light control panel is a light control liquid crystal panel; the first signal lines are first gate lines; the second signal lines are first data lines; the first gate lines and the first data lines are configured to respectively provide first gate signals and first data signals that are used for driving liquid crystal molecules in the light control units of the light control liquid crystal panel to rotate; the first mesh lines are second gate lines, the second mesh lines are second data lines; the second gate lines and the second data lines are configured to respectively provide second gate signals and second data signals that are used for driving liquid crystal molecules in the color subpixel units of the liquid crystal display panel to rotate.

For example, in the display panel provided by an embodiment of the present disclosure, the light control panel is a light control liquid crystal panel; the first signal lines are first gate lines, the second signal lines are first data lines; the first gate lines and the first data lines are configured to respectively provide first gate signals and first data signals that are for driving liquid crystal molecules in the light control units of the light control liquid crystal panel to rotate; and the first mesh lines and the second mesh lines constitute a second black matrix.

For example, the display panel provided by an embodiment of the present disclosure further comprises an isotropic diffusion film (IDF); the IDF is configured to allow light adjusted by the light control panel to enter the IDF, and then to be incident into the liquid crystal display panel after the light is subjected to isotropic diffusion.

For example, the display panel provided by an embodiment of the present disclosure further comprises a second polarizer and a third polarizer; the second polarizer is on the second base substrate; the third polarize is on the fourth base substrate; and the haze of at least one selected from a group consisting of the first polarizer and the second polarizer is in a range of 0%~55%.

For example, in the display panel provided by an embodiment of the present disclosure, the haze of at least one selected from the group consisting of the first polarizer and the second polarizer is in a range of 25%~55%.

At least one embodiment of the disclosure further provides a display device, and the display device comprises any one of the display panels provided by the embodiments of the present disclosure, and a backlight unit; the backlight unit is disposed on a side, away from the liquid crystal display panel, of the light control panel.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

FIG. 8B is a data schematic of influence of distance d on rainbow stripes;

FIG. 8C is a data schematic of influence of refractive index N of adhesion layer on rainbow stripes;

FIG. 8D is a data schematic of influence of refractive index N of adhesion layer on rainbow stripes.

DETAILED DESCRIPTION

Figure 1A:
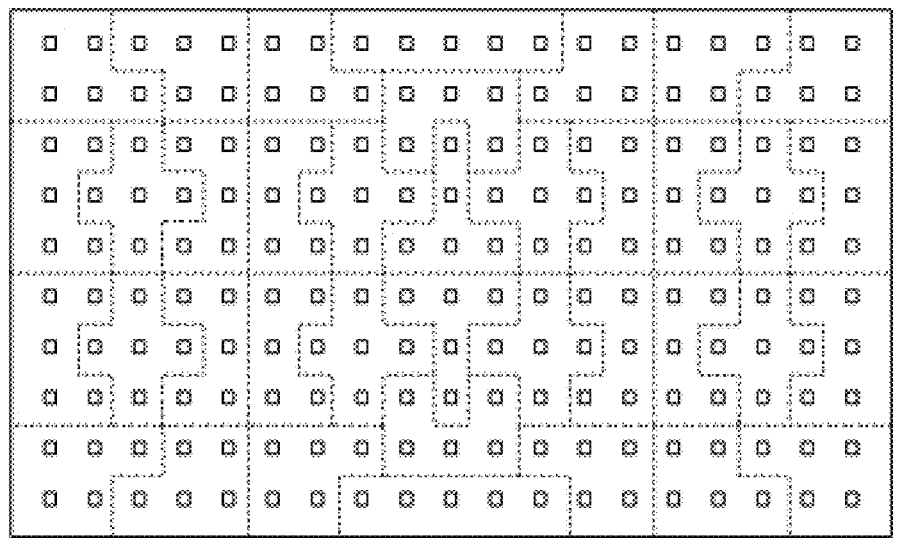
FIG. 1A and FIG. 1B are schematic diagrams illustrating local dimming.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive operation, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. "Inside," "outside," "on," "under" and the like are only used to indicate relative position relationship, and when the absolute position of the object which is described is changed, the relative position relationship may be changed accordingly.

The drawings in the present disclosure are not drawn strictly according to actual scale, and the number of pixel units and the number of light control units in the display panel are not limited to those shown in the figures. The specific size and number of each structure can be determined according to actual needs. The drawings described in this disclosure are only schematic structural views.

A liquid crystal display panel includes a liquid crystal panel and a backlight unit. In general, the liquid crystal panel includes an array substrate and an opposite substrate (e.g., a color filter substrate) which are opposite to each other to constitute a liquid crystal cell; a liquid crystal layer is filled between the array substrate and the opposite substrate in the liquid crystal cell; a first polarizer is disposed on the array substrate, a second polarizer is disposed on the opposite substrate, and the polarization direction of the first polarizer and the polarization direction of the second polarizer are perpendicular to each other. A backlight unit is disposed on a non-display side of the liquid crystal panel and configured to provide a planar source for the liquid crystal panel. Liquid crystal molecules of the liquid crystal layer are twisted under the action of driving electric fields formed between a pixel electrode disposed on the array substrate and a common electrode disposed on the array substrate or a common electrode disposed on the opposite substrate, so as to control the polarization direction of light. Moreover, the transmittance ratio of light is controlled under the cooperation of the first polarizer and the second polarizer, so as to realize grayscale display. The backlight unit may be a direct-lit backlight unit or a side-lit backlight unit. The direct-lit backlight unit includes a plurality of point sources (such as light-emitting diodes (LEDs)) arranged in parallel and a diffuser plate. Light emitted by these point sources is incident into the liquid crystal display panel for display after the light is homogenized through the diffuser plate.

For example, as for the liquid crystal display panel, the direct-lit backlight unit can be controlled by local dimming technology, so as to improve the display quality of the display panel. The local dimming technology not only can reduce the power consumption of the display panel but also can realize the dynamic dimming of backlight regions, greatly improve the contrast of display images, and improve the display quality of the display panel.

Local dimming technology can divide the entire backlight unit into a plurality of backlight blocks that are independently driven, and each backlight block includes one or more LEDs. According to the grayscale that must be displayed by different parts of a display image, the driving current of LEDs of backlight blocks corresponding to these parts is automatically adjusted so as to realize the independent adjustment of the brightness of each block in the backlight unit, thereby alleviating the contrast of the display image. For example, in an exemplary direct-lit backlight unit, the schematic diagram illustrating the region division of the LED light source in the entire back panel is as shown in FIG. 1A; a small square in the figure represents one LED unit; and a plurality of regions defined by the dashed lines represent a plurality of backlight blocks. Each backlight block includes one or more LED units and is controlled independent from other backlight blocks. For example, the LEDs in each backlight block are linked, that is, currents flowing across the LEDs in the same backlight block are consistent.

Figure 1B:
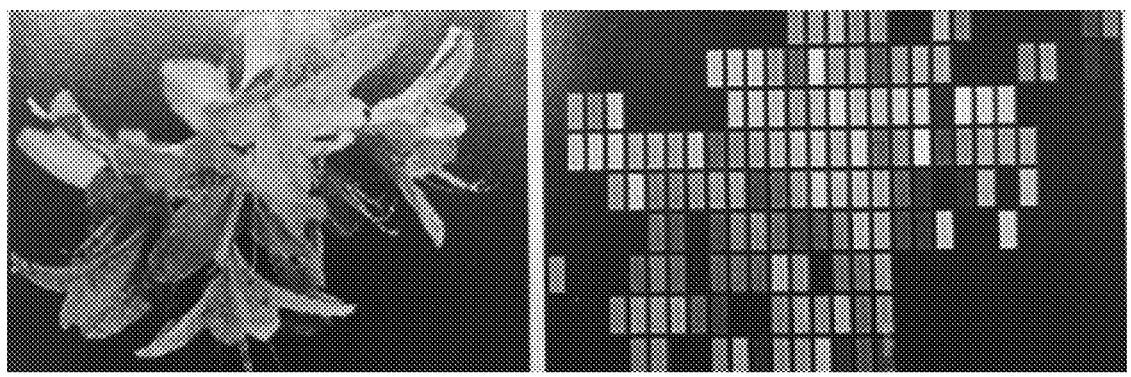

Local dimming technology can adjust the brightness of the backlight block according to the grayscale of image content displayed by the liquid crystal display panel. FIG. 1B is a schematic diagram illustrating a display image obtained after local dimming and the display brightness of a backlight block corresponding to the display image. As shown in FIG. 1B, the backlight unit includes a plurality of rectangular backlight blocks arranged in an array. Local dimming technology can adjust the brightness of corresponding backlight block according to the grayscale of the image content displayed by the liquid crystal display panel. As for parts with high image brightness (grayscale), the brightness of corresponding backlight block is also high; and as for parts with low image brightness, the brightness of corresponding backlight block is also low, so as to achieve the objectives of reducing the power consumption of the backlight, alleviating the contrast of the display image, and alleviating the display image quality.

However, the above local dimming technology is applicable to direct-lit backlight units, and LEDs taken as the light source are, for example, uniformly distributed on the entire back lights source plate. In order to apply the local dimming technology to, for example, a side-lit backlight unit, a light control panel must be additionally arranged between the liquid crystal display panel and the side-lit backlight unit, and the light control panel can control the transmittance ratio in preset regions. As for parts with high image brightness (grayscale), the transmittance ratio of the corresponding region of the light control panel is also high, and more light from the backlight unit is allowed to pass through the light control panel; and as for parts with low image brightness, the transmittance ratio of the corresponding regions of the light control panel is also low, and less light from the backlight unit is allowed to pass through the light control panel, so as to achieve the objectives of alleviating the contrast of the display image and alleviating the display image quality. In addition, in the case where direct-lit backlight units are directly formed on a direct-lit backlight, the division of the backlight units is difficult to achieve high density (the number of backlight units in unit area) and precision. In the case of a high requirement on the division density and division precision of the light control units, the light control panel can be utilized to achieve this requirement, and the manufacturing process of the light control panel is easy to realize.

For example, each subpixel unit includes color filters of different colors, and light from the backlight enters the liquid crystal display panel after passing through the light control panel, and is then emitted from the color filters to realize color display. Because the backlight passes through a plurality of layers (e.g., the base substrate, the adhesion layer for bonding the liquid crystal display panel and the light control panel, etc.) and is refracted in the process of being conducted from the light incident side to the light-emitting side, so as to change the emitting position of the light, in the entire display region, the light emitted from the color filters of different colors is not uniform. Moreover, because the human eye is a fixed point in actual observation, a difference in viewing angle exists between the position of the display panel close to the human eyes and the position away from the human eyes. Thus, different regions of the display panel have the problem of uneven color mixing, that is, rainbow stripes are generated. For example, the rainbow stripes are three mixed color stripes of magenta, yellow and cyan.

At least one embodiment of the present disclosure provides a display panel, and the display panel comprises a liquid crystal display panel and a light control panel stacked with the liquid crystal display panel; the liquid crystal display panel comprises a plurality of mesh lines, the plurality of mesh lines comprise a plurality of first mesh lines extending along a first direction and a plurality of second mesh lines extending along a second direction, the first direction and the second direction intersect with each other, and the plurality of first mesh lines and the plurality of second mesh lines define a plurality of color subpixel units arranged in an array; the light control panel is configured to allow back light to be incident into the liquid crystal display panel after passing through the light control panel, and comprises a plurality of signal lines; the plurality of signal lines comprise a plurality of first signal lines extending along the first direction and a plurality of second signal lines extending along the second direction; the plurality of first signal lines and the plurality of second signal lines define a plurality of light control units arranged in an array; N color subpixel units which are continuously arranged along the first direction constitute one pixel unit, and N is a positive integer; the N color subpixel units respectively display different colors; and along the first direction, a maximum length of one light control unit of the plurality of light control units is m times a maximum length of one pixel unit, and m is a non-integer.

Figure 2A:
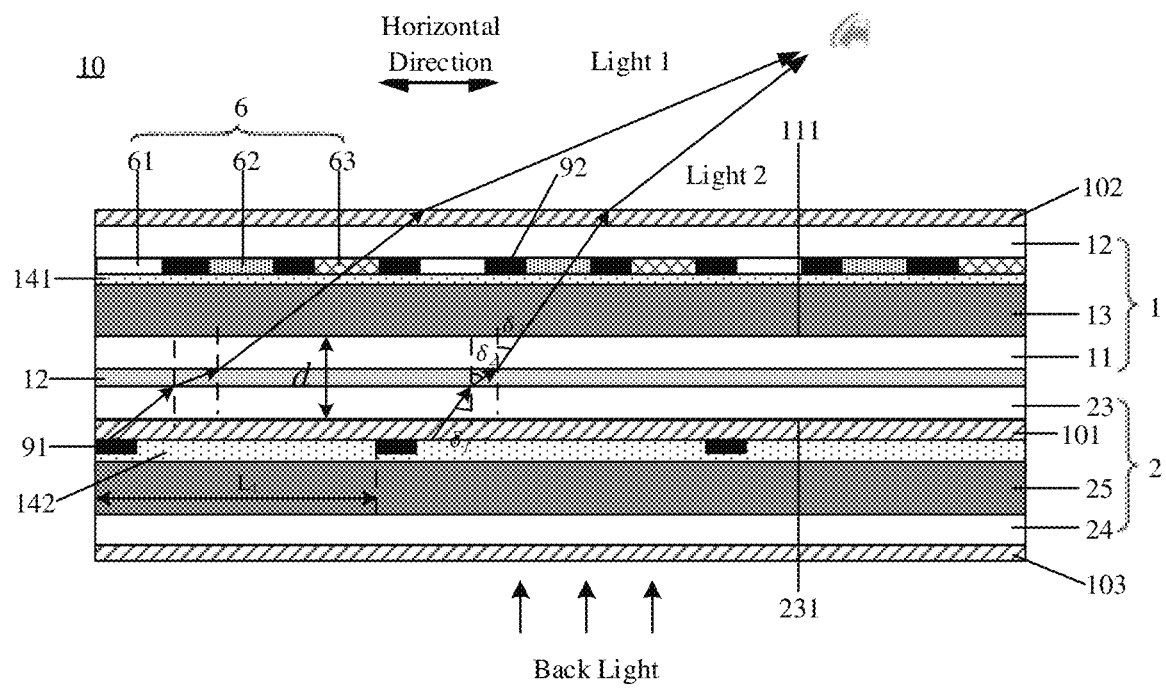
FIG. 2A is a schematic sectional view of a display panel provided by an embodiment of the present disclosure.
Figure 3A:
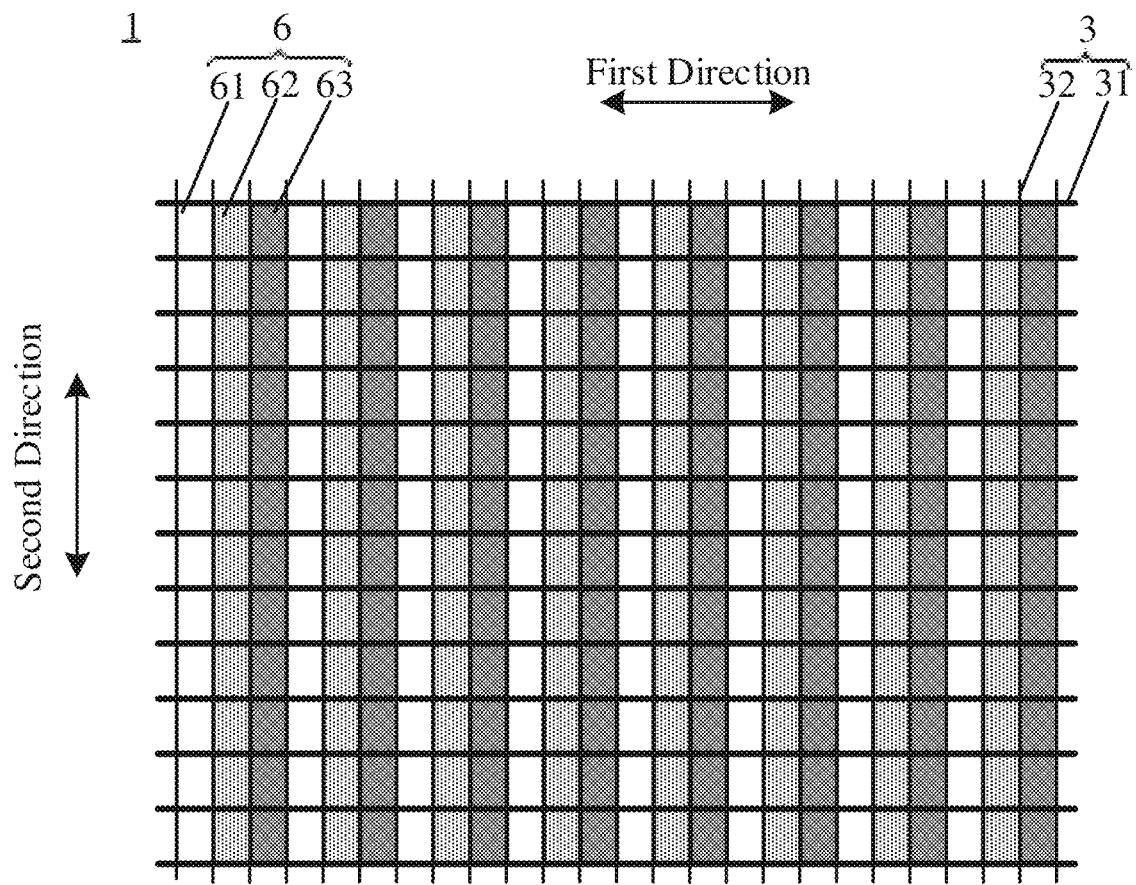
FIG. 3A is a schematic planar view of an light crystal display panel of the display panel illustrated in FIG. 2A.
Figure 3B:
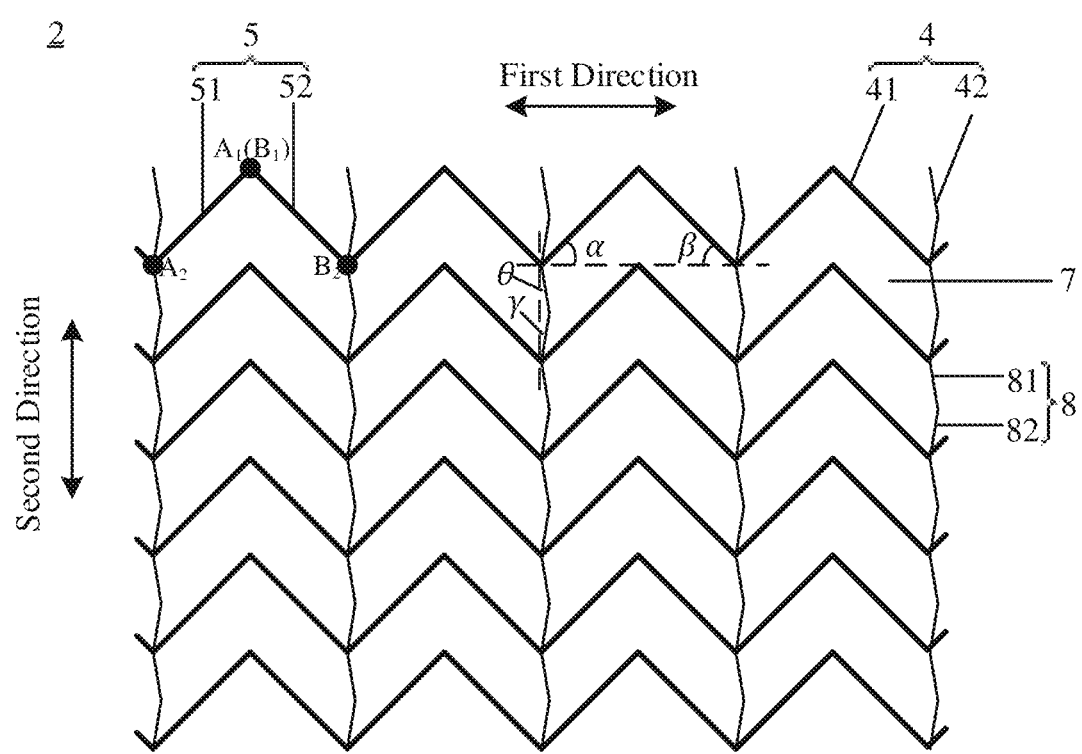
FIG. 3B is a schematic planar view 1 of a light control panel of the display panel illustrated in FIG. 2A.
Figure 3C:
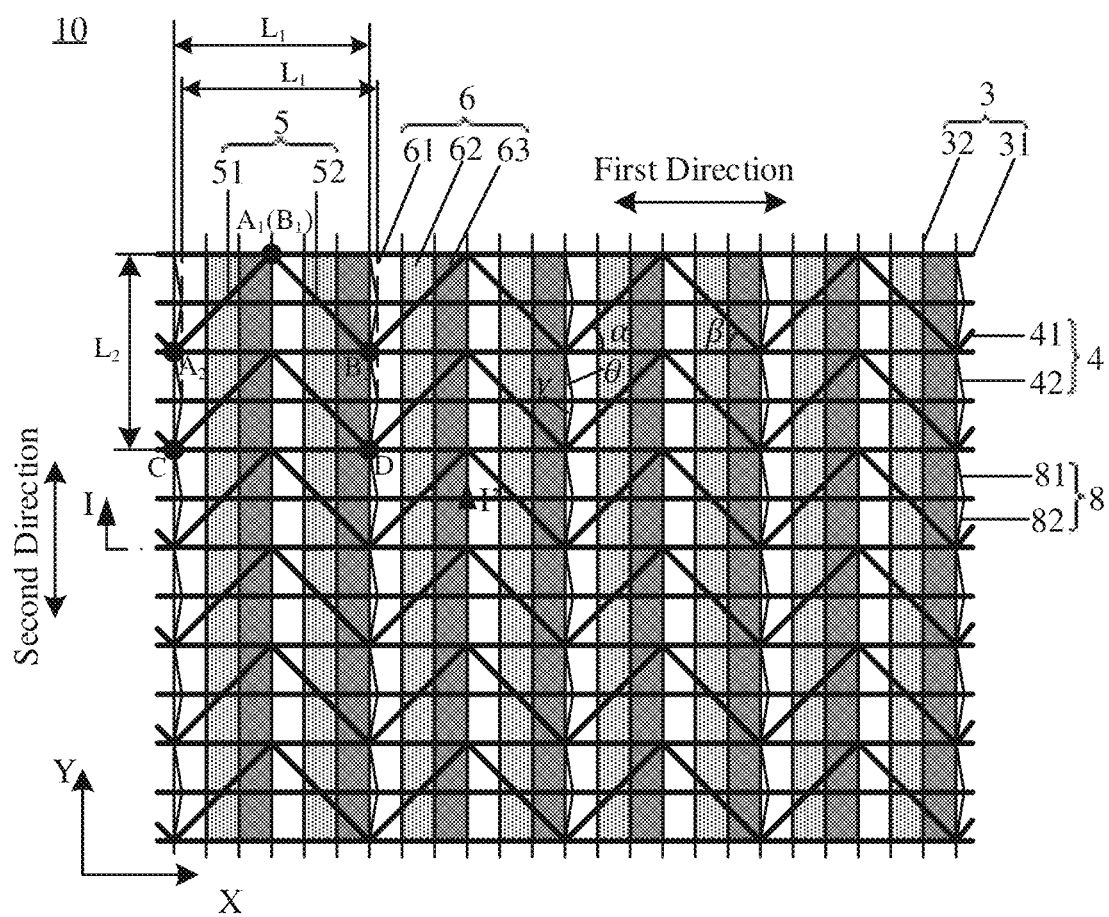
FIG. 3C is a schematic planar view 1 of a display panel provided by one embodiment of the present disclosure.

Illustratively, FIG. 3A is a schematic planar view of the liquid crystal display panel of the display panel illustrated in FIG. 2A. FIG. 3B is a schematic planar view 1 of the light control panel of the display panel illustrated in FIG. 2A. FIG. 3C is a schematic planar view 1 of the display panel provided by an embodiment of the present disclosure. FIG. 2A is a sectional view along the I-I' line in FIG. 3C. As shown in FIG. 2A and FIGS. 3A-3C, a display panel 10 comprises an liquid crystal display panel 1 and a light control panel 2 stacked with the liquid crystal display panel 1. The light control panel 2 is configured to allow back light to be incident into the liquid crystal display panel 1 after passing through the light control panel 2. The back light is light from a backlight source. The liquid crystal display panel 1 is configured to achieve a display function. The light control panel 2 is configured to control the direction or intensity of the back light incident into the liquid crystal display panel 1, for example, to satisfy the requirement of realizing the conversion between a narrow viewing angle and a wide viewing angle, controlling luminous intensities at various positions of the display panel to be different, etc. For example, the back light may be from a direct-lit backlight or a side-lit backlight.

As shown in FIG. 3A and FIG. 3C, the liquid crystal display panel 1 includes a plurality of mesh lines 3. The plurality of mesh lines 3 include a plurality of first mesh lines 31 extending along a first direction and a plurality of second mesh lines 32 extending along a second direction, and the first direction and the second direction intersects with each other. For example, the first direction is perpendicular to the second direction. The plurality of first mesh lines 31 and the plurality of second mesh lines define a plurality of color subpixel units arranged in an array. For example, the plurality of first mesh lines 31 and the plurality of second mesh lines 32 are all straight lines. N color subpixel units that are continuously arranged along the first direction constitute one pixel unit 6, and N is a positive integer. For example, as shown in FIG. 3A, N=3. For example, three subpixel units in one pixel unit 6 are respectively a first subpixel unit 61, a second subpixel unit 62 and a third subpixel unit 63. For example, the N subpixel units in one pixel unit 6 respectively emit different chromatic light, that is, the N subpixel units in one pixel unit 6 respectively display different colors, so as to realize color display. For example, the first subpixel unit 61, the second subpixel unit 62 and the third subpixel unit 63 respectively emit red light, green light and blue light. In another embodiment, for example, four subpixel units that are continuously arranged along the first direction constitute one pixel unit. For example, the four color subpixel units respectively emit red light, green light, blue light and white light. Of course, the design of the subpixel units in one pixel unit 6 is not limited to the cases listed above, and the subpixel units in one pixel unit 6 are designed as required.

With reference to FIG. 3B and FIG. 3C, the light control panel 2 includes a plurality of signal lines 4. The plurality of signal lines 4 include a plurality of first signal lines 41 extending along the first direction and a plurality of second signal lines 42 extending along the second direction. The plurality of first signal lines 41 and the plurality of second signal lines 42 define a plurality of light control units 7 arranged in an array. For example, the plurality of mesh lines 3 of the liquid crystal display panel 1 are straight lines extending along the first direction and the second direction, the first direction and the second direction intersect with each other. For example, planar shapes of the plurality of subpixel units defined by the intersected mesh lines 3 are all rectangle. At least a part of the plurality of signal lines 4 includes a fold line(s), so that the planar shape of the light control unit 7 is different from the planar shape of the subpixel unit, and the arrangement rule of the light control units 7 is different from that of the subpixel units. For example, the planar shape of each the light control unit 7 is not rectangle, for example, is an irregular pattern as shown in FIG. 3B. Moreover, for example, in the first direction or the second direction, orthographic projections of the signal lines 4 on the liquid crystal display panel 1 (referring to an orthographic projections on a surface, facing the light control panel 2, of the liquid crystal display panel 1) intersect with the mesh lines 3; and the signal lines 4 do not have same or similar patterns with the mesh lines 3, so that the human eyes cannot sense moire patterns, thereby achieving the effect of eliminating or alleviating moire patterns and alleviating or eliminating the problem of obvious moire patterns. As shown in FIG. 3B and FIG. 3C, in the display panel 10 provided by the embodiment of the present disclosure, the plurality of pixel units 6 and the plurality of light control units 7 are respectively arranged in an array. For example, the size and the shape of the plurality of pixel units 6 are basically the same, and the size and the shape of the plurality of light control units 7 are basically the same. For example, along the first direction, the maximum length $L_1$ of one light control unit 7 is m times the maximum length of one pixel unit 6, and m is a non-integer, which is proved by experiments to be able to achieve the effect of alleviating the rainbow stripe phenomenon of the display panel and elleviating the problem of poor display effect caused by the rainbow stripes.

Figure 3D:
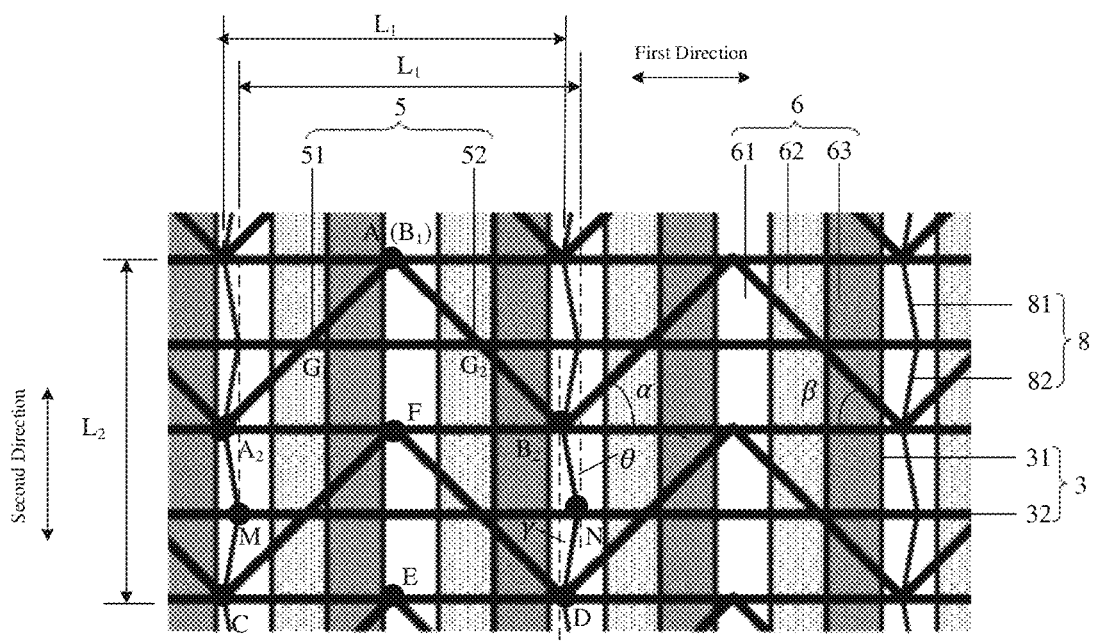
FIG. 3D is a schematic enlarged view of a part of FIG. 3C.

FIG. 3D is a schematic enlarged view of a part of FIG. 3C. For example, as shown in FIG. 3D, the planar pattern of one light control unit 7 is an irregular pattern. As shown in FIG. 3D, a pattern with vertexes of $A_1$, $A_2$, M, C, F, D, N and $B_2$ constitutes the planar pattern of one light control unit 7. It should be noted that in the present disclosure, the maximum length of one light control unit along the first direction refers to: a distance between vertexes, farthest away from each other in the first direction in the first direction, of one light control unit 7. For example, in the embodiment, in the vertexes of one light control unit 7, the distance between two different vertexes in the first direction is different, and the distance between two vertexes farthest away from each other in the first direction is the maximum length $L_1$ of one light control unit 7. For example, in the embodiment, along the second direction, the length values of one light control unit 7 in the first direction are different, and the maximum among these length values is the maximum length $L_1$ of one light control unit 7 along the first direction. Of course, in other embodiments, the planar pattern of one light control unit 7 may also be a regular pattern such as regular quadrangle, pentagon, hexagon, etc.

For example, in the embodiment as shown in FIG. 3C, 2.00129<m<2.00157. In this case, the effect of well alleviating the rainbow stripe phenomenon can be achieved. For example, m=2.00143. Experiments have proved that the effect of alleviating the rainbow stripes is optimum in the case where m=2.00143 within the range of 2.00129<m<2.00157.

Figures 7, 8A:
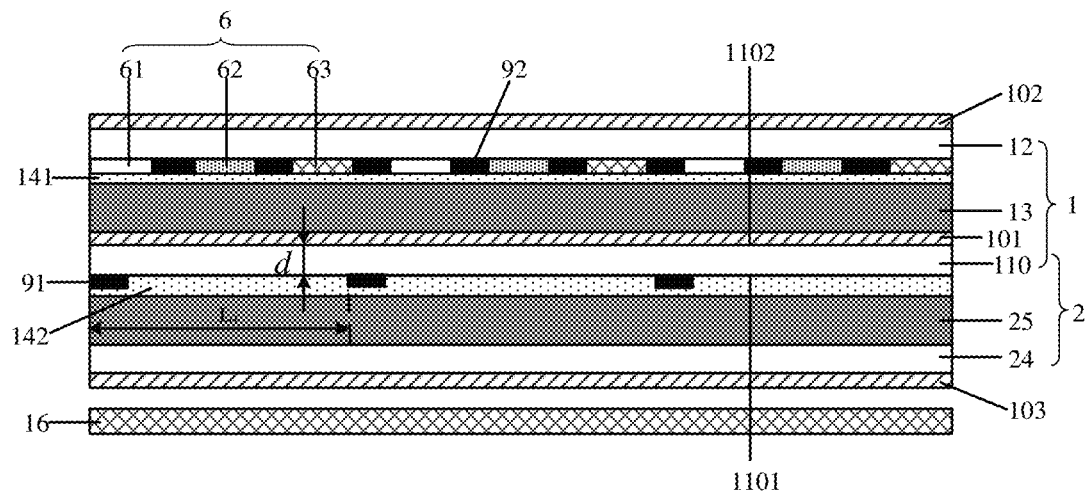
FIG. 7 is a schematic sectional view of the display device provided by an embodiment of the present disclosure.
FIG. 8A is a data schematic of influence of maximum length $L_1$ of one light control unit on rainbow stripes.

For example, in one embodiment, the size of the display panel 10 is 65 inches, that is, the planar pattern of the display panel 10 is rectangle, and the length of the diagonal of the rectangle is 65 inches. For example, the length of the display panel 10 along the first direction is 190.5 cm. Moreover, the resolution of the display panel 10 is 4K, and the number of pixels is 4096×2160, 4096×3112, 3840×2160, etc. Along the first direction, the maximum length $L_1$ of one light control unit 7 is in a range of 744.15 μm-744.7 μm. In this case, the effect of well alleviating the rainbow stripe phenomenon can be achieved. For example, along the first direction, the maximum length $L_1$ of one light control unit 7 is 744.54 μm. Experiments have proved that the effect of alleviating the rainbow stripes is optimum in the case that the maximum length $L_1$ is 744.55 μm within the range of 744.15 μm-744.7 μm. FIG. 8A is a data schematic of a single comparison test result under different conditions of $L_1$. Gray stripes in FIG. 8A are results obtained after the rainbow stirpes generated by the display panel are converted into grayscale images, and the more obvious gray stripes indicates that the rainbow stripes are more obvious. With reference to the following FIG. 8A, in the case where the maximum length $L_1$ of one light control unit is in the range of 744.15 μm-744.7 μm, the effect of alleviating the rainbow stripes is better. Moreover, it can be seen from FIG. 8A, in the case where $L_1$=744.55 μm, the effect of alleviating the rainbow stirpes is optimum.

For example, in another embodiment, the size of the display panel 10 is 75 inches. That is, the planar pattern of the display panel 10 is rectangle, and the length of the diagonal of the rectangle is 75 inches. For example, the length of the display panel 10 along the first direction is 190.5 cm. Moreover, the resolution of the display panel 10 is 4K, and the number of pixel units is 4096×2160, 4096×3112, 3840×2160, etc. The pixel unit is composed of a plurality of color subpixel units. Along the first direction, the maximum length $L_1$ of one light control unit 7 is in a range of 859.5 μm-856.0 μm. In this case, the effect of well alleviating the rainbow stripe phenomenon can be achieved. For example, along the first direction, the maximum length $L_1$ of one light control unit 7 is 859.85 μm. Experiments have proved that the effect of alleviating the rainbow stripes is optimum in the case where the maximum length $L_1$ is 859.85 μm within the range of 859.5 μm-856.0 μm.

For example, along the second direction, the maximum width $L_2$ of one light control unit 7 is n times the maximum width of one pixel unit, and n is a positive integer. That is, the maximum width $L_2$ of one light control unit 7 in the second direction is equal to a sum of the maximum widths of n continuously arranged pixel units 6, in this way, experiments have proved that the rainbow stripe phenomenon can be well alleviated, and meanwhile, a plurality of light control units 7 are regularly arranged, so as to facilitate manufacturing. Thus, the manufacturing difficulty is reduced while the problem of poor display effect caused by the rainbow stripes is solved; the yield of products is improved; and it is of great significance for alleviating the production efficiency and saving costs.

Figure 4:
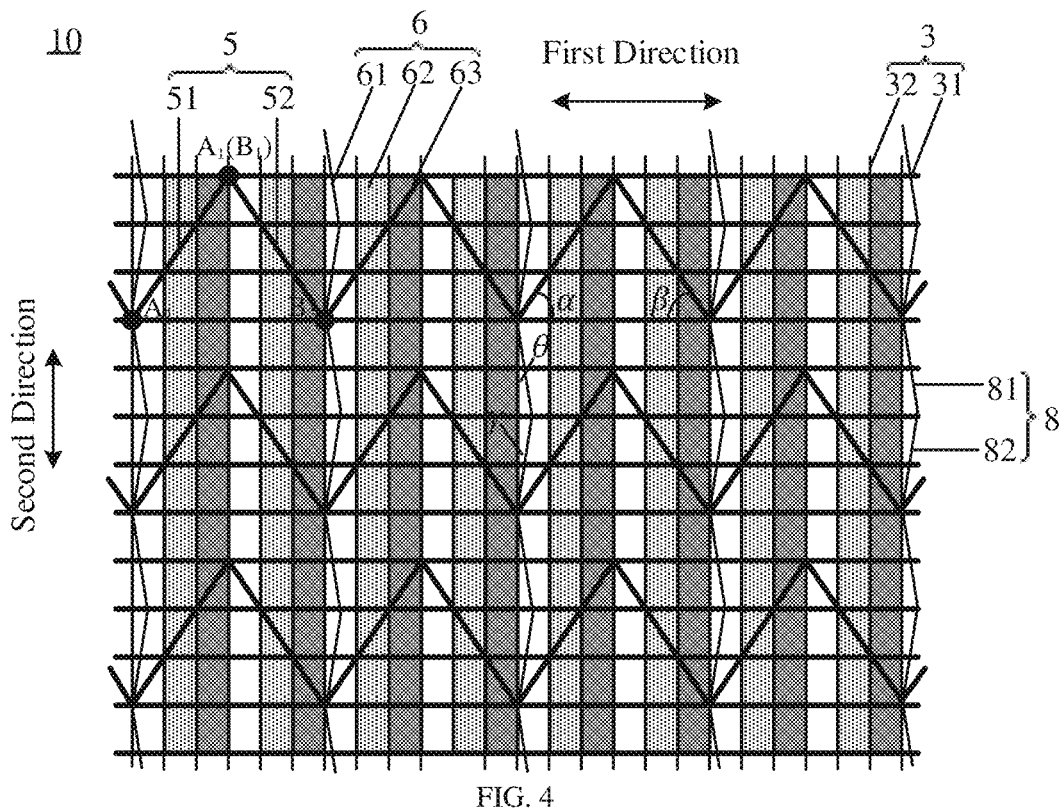
FIG. 4 is a schematic planar view 2 of the display panel provided by one embodiment of the present disclosure.

For example, in the display panel 10 as shown in FIG. 3C, n=4. Moreover, for example, FIG. 4 is a schematic planar view 2 of the display panel provided by one embodiment of the present disclosure. In the display panel 10 as shown in FIG. 4, n=7.

For example, in the embodiment as illustrated in FIG. 3C, the shape of the light control unit 7 is an irregular pattern. In other embodiments, the shape of the light control unit 7 may also be a regular pattern such as a rectangle.

It should be noted that the maximum width of one light control unit 7 in the present disclosure refers to: the distance between a first end of one light control unit and a second end of the one light control unit which is farthest away from the first end in an axis along the second direction (Y axis in FIG. 3C). For example, in FIG. 3C, the maximum width of one light control unit 7 in the second direction refers to: the distance from the first end $A_1$ of the light control unit 7 to the second end C in the light control unit which is farthest away from the first end $A_1$.

Figures 8B, 8C, 8D:
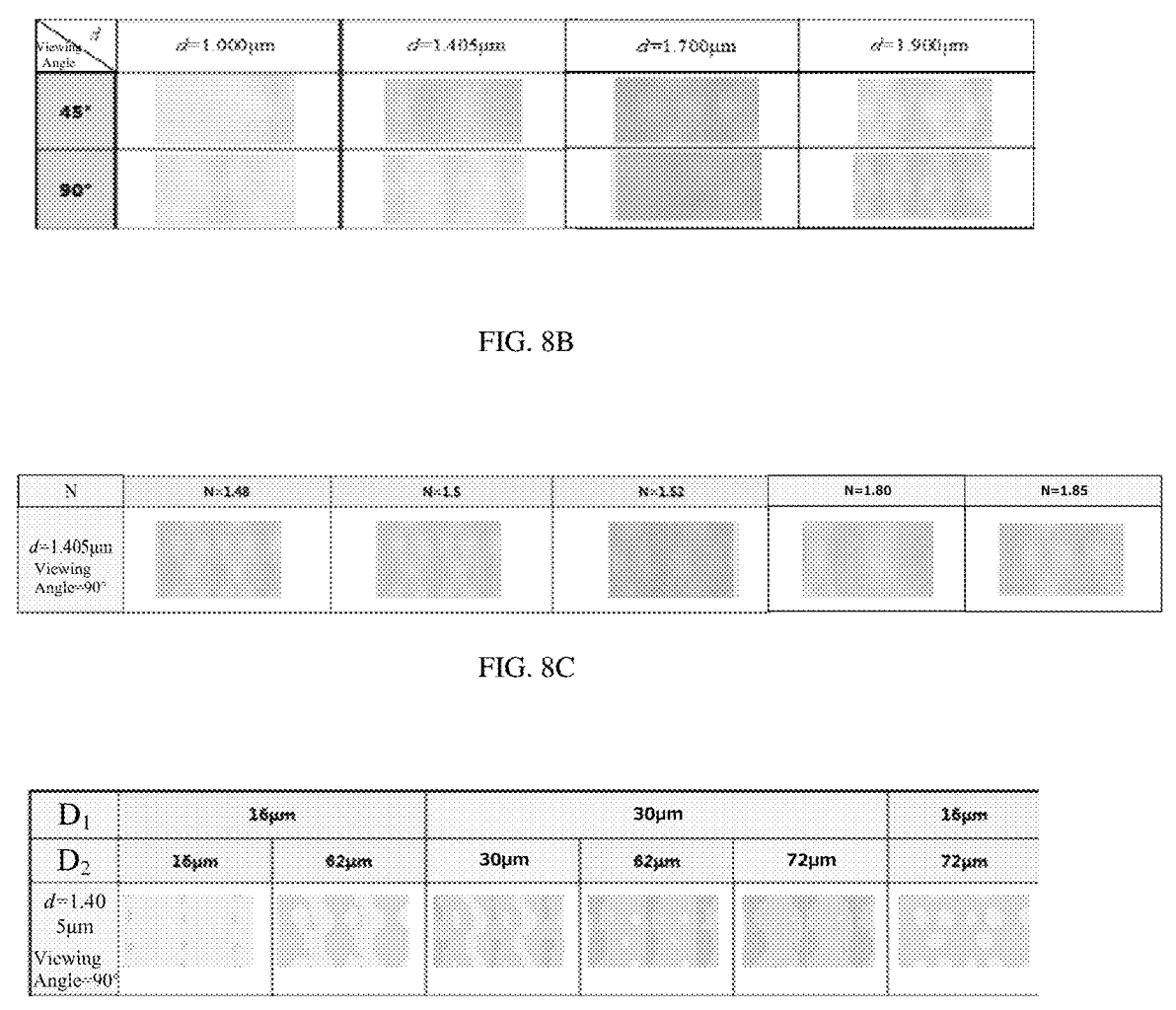

For example, as shown in FIG. 2A, the liquid crystal display panel 1 includes a first base substrate 11, a second base substrate 12 and a liquid crystal display layer 13. The second base substrate 12 is opposite to the first base substrate 11 and is disposed on a side, away from the light control panel 2, of the first base substrate 11; and the liquid crystal display layer 13 is disposed between the first base substrate 11 and the second base substrate 12. For example, the light control panel 2 is a liquid crystal light control panel and includes a third base substrate 23, a fourth base substrate 24 and a light control liquid crystal layer 25. The fourth base substrate 24 is disposed on a side, away from the light control panel 2, of the third base substrate 23, and the light control liquid crystal layer 25 is disposed between the third base substrate 23 and the fourth base substrate 24. The distance d between a first surface 111, away from the light control panel 2, of the first base substrate 11 and a first surface 231, away from the liquid crystal display panel 1, of the third base substrate 23 is less than or equal to 1.7 mm. It is proved by analysis and prediction and by experiments that: the rainbow stripes can be weakened by reducing the distance. FIG. 8B is a single comparison test result data schematic under different conditions of the distance d. Gray stripes in FIG. 8B are results obtained after the rainbow stripes generated by the display panel are converted into grayscale images. When the grayscale stripes are more obvious, the rainbow stripes are more obvious. With reference to the following FIG. 8B, as the distance d is reduced, the effect of alleviating the rainbow stripes is gradually improved. In the case where d is less than or equal to 1.7 mm, the effect of alleviating the rainbow stripes is better than others.

For example, the display panel 10 further comprises an adhesion layer 12 and a first polarizer 101. The adhesion layer 12 is disposed between the first base substrate 11 and the third base substrate 23 to bond the first base substrate 11 and the third base substrate 23 so that no air layer is disposed between the first base substrate 11 and the third base substrate 23. That is, the first base substrate 11 directly contact with the adhesion layer 12, and no air layer is between the first base substrate 11 and the adhesion layer 12, that is, no gap or component is between the first base substrate 11 and the adhesion layer 12. Moreover, the third base substrate 23 directly contact with the adhesion layer 12, and no air layer is between the third base substrate 23 and the adhesion layer 12, that is, no gap or component is between the first base substrate 11 and the adhesion layer 12, so as to avoid the increase of the thickness of a space between the first base substrate 11 and the third base substrate 23 in a direction perpendicular to the first base substrate 11. The first polarizer 101 is disposed on a first surface 231, away from the liquid crystal display panel 1, of the third base substrate 23. In this case, the distance d between the first surface 111 of the first base substrate 11 and the first surface 231 of the third base substrate 23 is equal to a sum of the thickness of the first base substrate 11 in the direction perpendicular to the first surface 111 of the first base substrate, the thickness of the third base substrate 23 in the direction perpendicular to the first surface 111 of the first base substrate 11, and the thickness of the adhesion layer 12 in the direction perpendicular to the first surface 111 of the first base substrate 11. In this embodiment, because the first polarizer 101 is disposed on the first surface 231 of the third base substrate 23, the arrangement of the first polarizer 101 between the first base substrate 11 and the third base substrate 23 is avoided, thereby reducing the above distance d and better alleviating the rainbow stripe phenomenon. For example, the thickness of the first base substrate 11 in the direction perpendicular to the first surface 111 of the first base substrate is 0.5 mm; the thickness of the third base substrate 23 in the direction perpendicular to the first surface 111 of the first base substrate is 0.5 mm; and the thickness of the adhesion layer 12 in the direction perpendicular to the first surface 111 of the first base substrate 11 is 0.5 mm. For example, the first base substrate 11 and the third base substrate 23 may be ultrathin substrates.

Figure 2B:
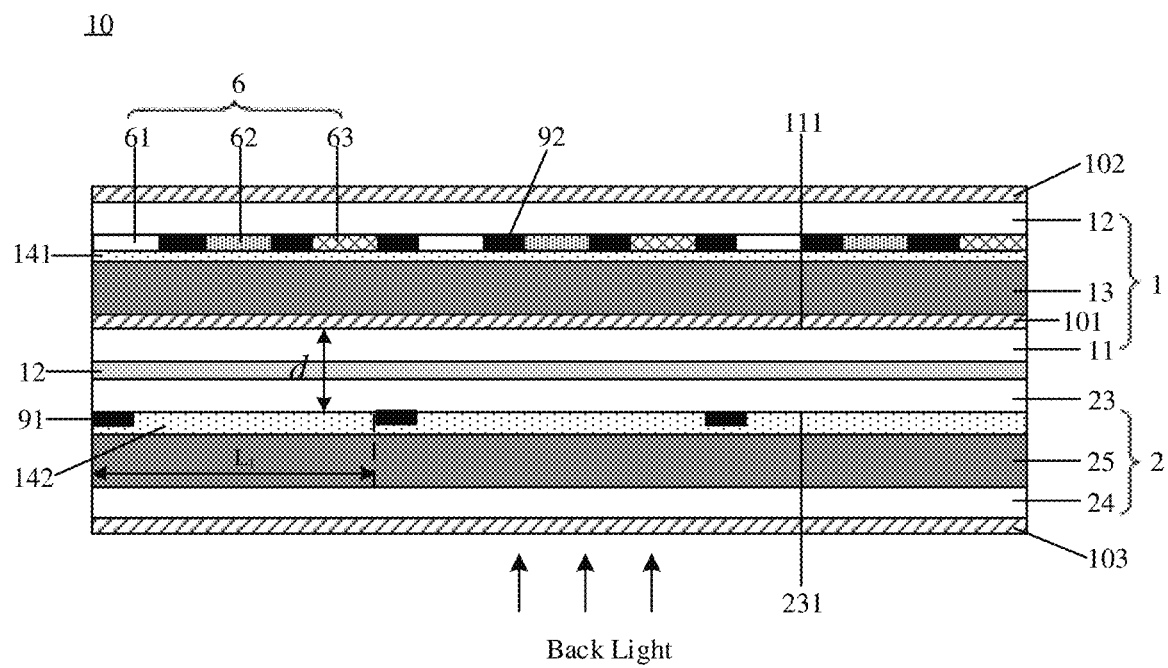
FIG. 2B is a schematic sectional view of another display panel provided by an embodiment of the present disclosure.

For example, FIG. 2B is a schematic sectional view of another display panel provided by an embodiment of the present disclosure. The difference between the display panel 10 as shown in FIG. 2B and the display panel 10 as shown in FIG. 2A is that the first polarizer 101 is disposed on the first surface 111, away from the light control panel 2, of the first base substrate 11, so as to avoid the arrangement of the first polarizer 101 between the first base substrate 11 and the third base substrate 23. The embodiment can also achieve the technical effect of better alleviating the rainbow stripe phenomenon by reducing the above distance d. Other unmentioned structures of the display panel as shown in FIG. 2B are all the same as those illustrated in FIG. 2A and are no repeated.

Figure 2C:
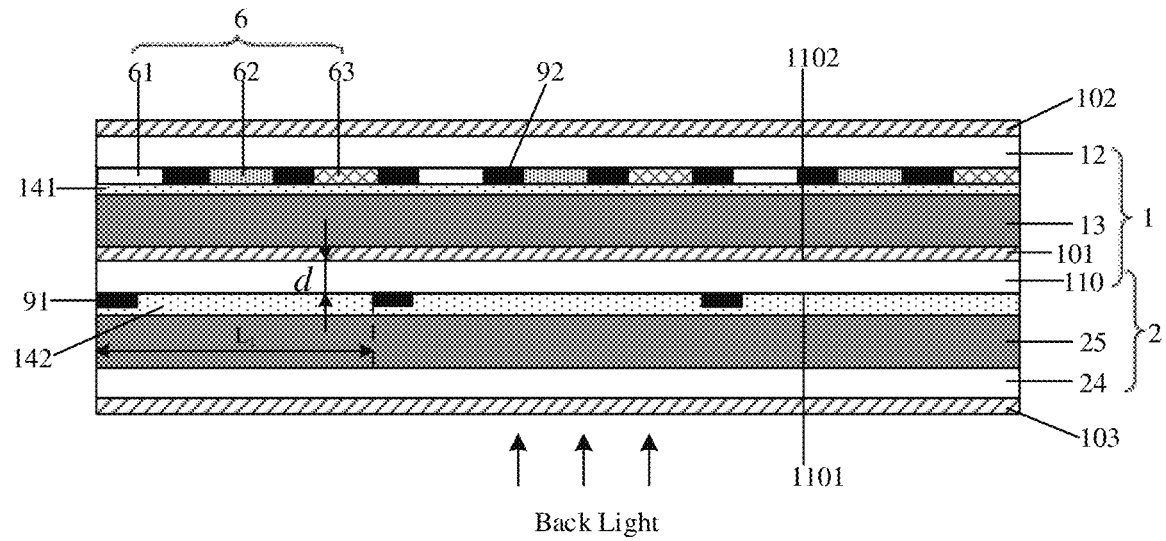
FIG. 2C is a schematic sectional view of still another display panel provided by an embodiment of the present disclosure.

For example, FIG. 2C is a schematic sectional view of another display panel provided by an embodiment of the present disclosure. The difference between the display panel 10 as shown in FIG. 2C and the display panel 10 as shown in FIG. 2A is that the first base substrate 11 and the third base substrate 23 are an integral structure. The integral structure constitutes a common substrate 110. The liquid crystal display panel 1 and the light control panel 2 share the common substrate 110. The integral structure refers to that the first base substrate 11 and the third base substrate 23 are integrated into one substrate, a material of the one substrate is uniform, and the one substrate is the common substrate 110. Thus, the case that the display panel 10 includes three base substrates can reduce the above distance d, so as to achieve the effect of better alleviating the rainbow stripes. Other unmentioned structures of the display panel as shown in FIG. 2C are all the same as those illustrated in FIG. 2A and are not be repeated.

In at least one embodiment, For example, as shown in FIG. 2A, light adjusted by the light control panel 2 (light 1 and light 2 in FIG. 2A) sequentially passes through the third base substrate 23, the adhesion layer 12 and the first base substrate 11, in this process, the light is subjected to a first refraction on an interface between the third base substrate 23 and the adhesion layer 12 first, and then is subjected to a second refraction on an interface between the adhesion layer 12 and the third base substrate 23. In this process, if the deviation of the above light in the horizontal direction (as shown by double arrows in FIG. 2A) is large, the rainbow stripe phenomenon is relatively severe, and then the user experience is affected. For example, the refractive index of the adhesion layer 12 is greater than the refractive index of the first base substrate 11 and greater than the refractive index of the third base substrate 23. Thus, under the condition of a fixed thickness of the first base substrate 11 in the direction perpendicular to the first surface 111 of the first base substrate, a fixed thickness of the third base substrate 23 in the direction perpendicular to the first surface 111 of the first base substrate, and a fixed thickness of the adhesion layer 12 in the direction perpendicular to the first surface 111 of the first base substrate, the deviation of the above light adjusted by the light control panel 2, towards the normal line (a dotted line in the light path diagram) in the above propagation path process, is reduced to compensate the deviation of the emitting position of the light in the horizontal direction in the above propagation path process. Therefore, the deviation degree and the unevenness degree of the light emitted from the subpixel units of different colors can be reduced, so as to alleviate the rainbow stripes.

For example, a difference between the refractive index of the adhesion layer 12 and the refractive index of the first base substrate 11 is less than 0.3, and a difference between the refractive index of the adhesion layer 12 and the third base substrate 23 is less than 0.3. For example, both the first base substrate 11 and the third base substrate 23 are glass substrates with the refractive index in a range of 1.4-1.5, and the refractive index of the adhesion layer 12 is less than 1.8. A material of the adhesion layer 12 include organic materials such as resin and may be selected by those skilled in the art as required. Experiments have proved that it is unfavorable for alleviating the rainbow stripes no matter the differences of the above refractive indexes are too large or too small, and a good effect of alleviating the rainbow stripes can be achieved in the case where the differences of the above refractive indexes are within the above ranges. FIG. 8C is a data schematic of single comparison test result under the condition that both the refractive indexes of the first base substrate 11 and the third base substrate 23 are 1.5 and the refractive index N of the adhesion layer 12 is different. Gray stripes in FIG. 8C are results obtained after the rainbow stirpes generated by the display panel are converted into grayscale images. When the gray stripes are more obvious, the rainbow stripes are more obvious. With reference to the following FIG. 8C, the effect of alleviating the rainbow stripes in the case of N>1.5 is better than the effect of alleviating the rainbow stripes in the case of N<1.5. That is, in the case where the refractive index of the adhesion layer 12 is greater than the refractive index of the first base substrate 11 and greater than the refractive index of the third base substrate 23, the effect of alleviating moire pattern is better; and when N>1.8, the effect of alleviating the rainbow stripes begins to decline. Therefore, when the difference between the refractive index of the adhesion layer 12 and the refractive index of the first base substrate 11 is less than 0.3 and the difference between the refractive index of the adhesion layer 12 and the refractive index of the third base substrate 23 is less than 0.3, the effect of alleviating the rainbow stripes is more ideal.

For example, the line width of each of the plurality of first signal lines 41 and the line width of each of the plurality of second signal lines 42 are less than or equal to 30 μm. Experiments have proved that within a certain range, the smaller the line width of the first signal lines and the second signal lines are, the weaker the rainbow stripes are. In the case where the line width of each of the plurality of first signal lines 41 and the line width of each of the plurality of second signal lines 42 are less than or equal to 30 μm, the rainbow stripe phenomenon of the display panel 10 is obviously alleviated.

In at least one embodiment, For example, as shown in FIG. 2C, the light control panel 10 further includes a first black matrix 91 covering the plurality of first signal lines 41 and the plurality of second signal lines 42. For example, the first black matrix 91 is on a first surface 1101, away from the liquid crystal display panel 1, of the common substrate 110, that is, orthographic projections of the plurality of first signal lines 41 and the plurality of second signal lines 42 on the first surface 1101 are within an orthographic projection of the first black matrix 91 on the first surface 1101. For example, the line width of the first black matrix 91 is less than or equal to 30 μm, so as to achieve the effect of alleviating the rainbow stripe phenomenon. For example, the pattern of the first black matrix 91 is the same as the pattern of the plurality of first signal lines 41 and the plurality of second signal lines 42, and the line width of the black matrix 91 is the same as the line width of each of the plurality of first signal lines 41 and the line width of each of the plurality of second signal lines 42, so as to improve the transmittance ratio of the display panel 10 while alleviating the rainbow stripes.

FIG. 8D is a single comparison test result data schematic under the condition of different line widths $D_1$ of the first signal lines and the second signal lines (or the line width of the black matrix). Gray stripes in FIG. 8D are result obtained after the rainbow stripes generated by the display panel are converted into grayscale images. When the gray stripes are more obvious, the rainbow stripes are more obvious. With reference to FIG. 8D, the effect of alleviating the rainbow stripes in the case where the line width $D_1$ of the first signal lines and the second signal lines (or the line width of the black matrix) is less than or equal to 30 μm is better than the effect of alleviating the rainbow stripes in the case where the line width $D_1$ of the first signal lines and the second signal lines (or the line width of the Balck matrix) is greater than 30 μm. Therefore, in the case where the line width $D_2$ of the first signal lines and the second signal lines (or the line width of the black matrix) is less than or equal to 30 μm, the effect of alleviating the rainbow stripes is better. In addition, the liquid crystal display panel and the light control panel further respectively comprise photo spacers (PS) for maintaining the thickness of the liquid crystal cell. The line width of $D_2$ of the first signal lines and the second signal lines (or the line width of the Balck matrix) at positions corresponding to the PSs is greater than or equal to $D_1$. According to FIG. 8D, when $D_1$ is less than or equal to 30 μm, $D_2$ is also less than or equal to 30 μm, so the effect of alleviating the rainbow stripes is better.

For example, the first signal lines 41 are first gate lines; the second signal lines 42 are first data lines; and the first signal lines 41 are insulated from the second signal lines 42, for example, an insulation layer that insulates the first signal lines 41 from the second signal lines 42 is disposed between the first signal lines 41 and the second signal lines 42. The first gate lines and the first data lines are configured to respectively provide second gate signals and second data signals for driving liquid crystal molecules (not shown) in the light control unit 7 of the light control panel 2 to rotate, so as to adjust the angle or intensity of an emergence angle of the back light by the light control panel 2. Moreover, for example, in another embodiment of the present disclosure, the first signal lines 41 are first data lines, and the second signal lines 42 are first gate lines. The type of the first signal lines 41 and the second signal lines is not limited in the embodiment of the present disclosure and may be determined according to the demand of arranging wires. More specifically, each light control unit 7 includes a thin-film transistor (TFT) (taken as a switch element), a pixel electrode and a common electrode; a gate electrode of the TFT is connected with the first gate line to receive the gate signal; the first electrode (e.g., the source electrode) of the TEE is connected with the first data line to receive the data signal; the second electrode (e.g., the drain electrode) of the TFT is connected with the pixel electrode so as to charge the pixel electrode when the TFT is in the on state; the common electrode and the pixel electrode constitute a liquid crystal capacitor together with the liquid crystal layer; and after the pixel electrode is charged, an electrical field is formed between the common electrode and the pixel electrode to control the rotation of the liquid crystal molecules in the liquid crystal layer. Corresponding to the light control panel adopting a vertical electric field or a horizontal electric field, the common electrode and the pixel electrode are arranged on the same substrate and adjacent to each other, or respectively arranged on different substrates opposite to each other so that the common electrode and the pixel electrode are opposite to each other.

In at least one embodiment, for example, the mesh lines 3 include second gate lines and second data lines. For example, the first mesh lines 31 are the second gate lines, and the second mesh lines 32 are the second data lines. The first mesh lines 31 are insulated from the second mesh lines 32. The second gate lines and the second data lines are configured to respectively provide second gate signals and second data signals for driving liquid crystal molecules (not shown) in the subpixel units of the liquid crystal display panel 1 to rotate. Or, in another embodiment, for example, the mesh lines 3 further include a second black matrix for preventing the crosstalk between chromatic light of adjacent subpixel units, and the second black matrix are disposed on the second base substrate 12 and define a plurality of color subpixel units. The second black matrix includes first black matrix strips extending along the first direction and second black matrix strips extending along the second direction. For example, the first mesh lines 31 and the second mesh lines 32 are respectively configured to be the first black matrix strips and the second black matrix strips; in a direction perpendicular to a display surface of the display panel, the first black matrix strips cover the first signal lines (e.g., the first gate lines) extending along the first direction, for example, having same profile with the first signal lines, and the second black matrix strips cover the second signal lines (e.g., the first data lines) extending along the second direction, that is, an orthographic projection of the first signal line on a surface, facing the light control panel 2, of the liquid crystal display panel 1 is within an orthographic projection of the first black matrix strip on the surface, facing the light control panel 2, of the liquid crystal display panel 1. For example, each first black matrix strip has the same profile with each second signal line, that is, the orthographic projection of the first signal line on the surface, facing the light control panel 2, of the liquid crystal display panel 1 coincides the orthographic projection of the first black matrix strip on the surface, facing the light control panel 2, of the liquid crystal display panel 1. More specifically, each pixel unit 7 includes a TFT (taken as a switch element), a pixel electrode and a common electrode; the gate electrode of the TFT is connected with the second gate line to receive the gate signal; the first electrode (e.g., the source electrode) of the TFT is connected with the second data line to receive the data signal; the second electrode (e.g., the drain electrode) of the TFT is connected with the pixel electrode so as to charge the pixel electrode when the TFT is in the on state; the common electrode and the pixel electrode constitute a liquid crystal capacitor together with the liquid crystal layer; and after the pixel electrode is charged, an electric field is formed between the common electrode and the pixel electrode to control the rotation of the liquid crystal molecules in the liquid crystal layer. Corresponding to the liquid crystal display panel adopts a vertical electric field or a horizontal electric field, the common electrode and the pixel electrode are disposed on the same substrate and adjacent to each other, or respectively disposed on different substrates that are opposite to each other so that the common electrode and the pixel electrode are opposite to each other. For example, the liquid crystal display panel further includes color filters for color display.

It should be noted that the drawings of the embodiments of the present disclosure only show structures directly relevant to the core concept of the present disclosure, and as for other structures of the liquid crystal display panel 1, e.g., a display driving circuit, color filters, the interlayer insulation layer and the like, and other structures of the light control panel 2, e.g., a light control driving circuit and the like, those skilled in the art may refer to the conventional technology.

For example, in some embodiments, at least a part of the plurality of first signal lines includes a fold line(s), and at least a part of the plurality of second signal line includes a fold line(s). It should be noted that the scheme that at least a part of the plurality of first signal line includes a fold line(s) includes the case that for at least a part of the first signal lines (some first signal lines of the plurality of first signal lines), an entirety of each first signal line includes a fold line(s), and also includes the case that a part of one signal line includes a fold line(s). The explanation that at least a part of the plurality of second signal lines includes a fold line(s) is the same.

For example, in the embodiment as shown in FIGS. 3A-3C, the plurality of first signal lines 41 are all fold lines, and the plurality of second signal lines 42 are all fold lines. The plurality of pixel units 6 and the plurality of light control units 7 are respectively arranged in an array and respectively have respective arrangement periods in the first direction and the second direction. For example, the first signal lines 41 are fold lines and include a plurality of first fold line units which are continuously and periodically arranged. Moreover, one first fold line unit 5 corresponds to one light control unit 7, that is, the first fold line unit 5 crosses one light control unit 7 in the first direction. Moreover, each first fold line unit 5 includes a first portion 51 and a second portion 52 which are sequentially arranged along the first direction; the first portion 51 includes a first end A1 connected with the second portion 52; and the second portion 52 includes a first end B1 connected with the first portion 51. That is, the first end A1 of the first portion 51 is connected with the first end B1 of the second portion 52; a connection point of the first portion 51 and the second portion 52 is A1 (B1); and the point A1 coincides with the point B1. It should be noted that the above term "continuously and periodically arranged" indicates that the pattern of each first fold line unit 5 is the same; two adjacent first fold line units 5 are connected with each other and continuously distributed; and a second end A2 of the first portion 51 of one first fold line unit 5 is connected with a second end B2 of the second portion 52 of the first fold line unit 5 adjacent to the first fold line unit, for example, two adjacent first fold line units 5 are connected to the point A2 and the point B2. Patterns of the fold lines of the first signal lines 41 can achieve good effect of eliminating or alleviating the moire pattern, and the periodically arranged structure is simple and convenient to be manufactured.

For example, as shown in FIG. 3D, because the above m is a non-integer, orthographic projections of intersections (e.g., the point $A_2$ and the point $B_2$) of at least a part of the first signal lines 41 (some first signal lines 41) and at least a part of the second signal lines 42 (some second signal lines 42) on the surface, facing the light control panel 2, of the liquid crystal display panel 1 do not overlaps with orthographic projections of the second mesh lines 32 on the surface, facing the light control panel 2, of the liquid crystal display panel 1; and an orthographic projection of a connection point $A_1$ ($B_1$) of the first end $A_1$ of the first portion 51 of at least a part of first fold line units 5 in the plurality of first fold line units 5 and the first end $B_1$ of the second portion 52 of the at least a part of first fold line units 5 in the plurality of first fold line units 5 does not overlap with an orthographic projection of one second mesh line 32 on the surface, facing the light control panel 2, of the liquid crystal display panel 1.

For example, as shown in FIG. 3B, the first portion 51 and the second portion 52 of the first fold line unit 5 are straight line segments, for example, a bent portion of the first fold line unit includes a corner; or in other embodiments, for example, the first portion 51 and the second portion 52 of the first polygonal unit 5 are curved line segments, for example, the bent portion of the first fold line unit does not include a corner but is curved (e.g., the bent portion includes an arc).

For example, as shown in FIG. 3B and FIG. 3C, the first portion 51 of the first fold line unit 5 has a first included angle α with the first direction (namely X axis); the second portion 52 of the first fold line unit 5 has a second included angle β with the first direction; and both the first included angle and the second included angle are in a range of 37°~70°, for example, the first included angle α is equal to or not equal to the second included angle β.

For example, as shown in FIG. 3B and FIG. 3C, the second signal line 42 includes a fold line and includes a plurality of second fold line units 8 which are periodically arranged, and one second fold line unit 8 corresponds to one light control unit 7. One second fold line unit 8 includes a first portion 81 and a second portion 82 which are sequentially arranged along the second direction. The first portion 81 includes a first end connected with the second portion 82, and the second portion 82 includes a first end connected with the first portion 81. That is, the first end of the first portion 81 of the second fold line unit 8 is connected with the first end of the second portion 82 of the second fold line, and a connection point of the first end of the first portion 81 and the first end of the second portion 82 is a point M. Thus, both the second signal lines 42 and the first signal lines are fold lines, so as to further alleviate the effect of eliminating the moire patterns while alleviating the above rainbow stripe phenomenon.

For example, as shown in FIG. 3C and FIG. 3D, the first portion 81 of the second fold line unit 8 has a third included angle θ with the second direction; the second portion 82 of the second fold line unit 8 has a fourth included angle γ with the second direction; and both the third included angle θ and the fourth included angle γ are less than 7°. Overlarge third include angle θ and fourth included angle γ can obviously increase the degree of irregularity of the pattern of the signal lines 4, and overlarge degree of irregularity of the pattern of the signal lines 4 is unfavorable for eliminating the moire pattern. The scheme in which both the third included angle θ and the fourth included angle γ are less than 7° can avoid this problem. For example, the third included angle θ is equal to or not equal to the fourth included angle γ.

Figure 5A:
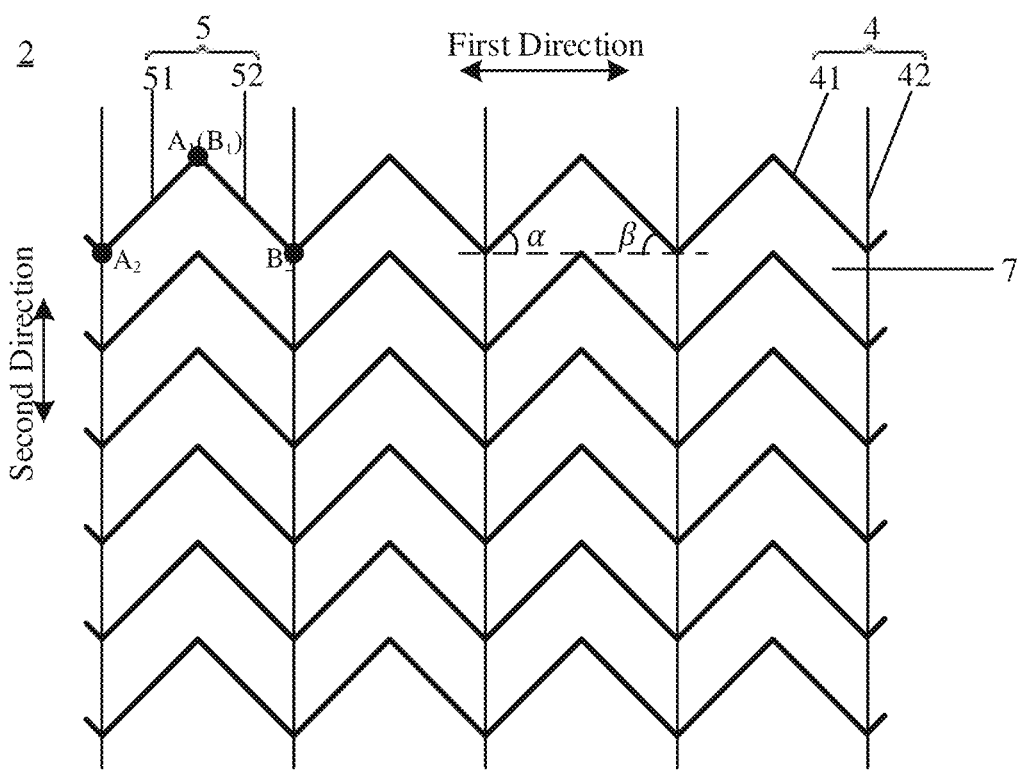
FIG. 5A is a schematic planar view 2 of the light control panel of the display panel in FIG. 2A.
Figure 5B:
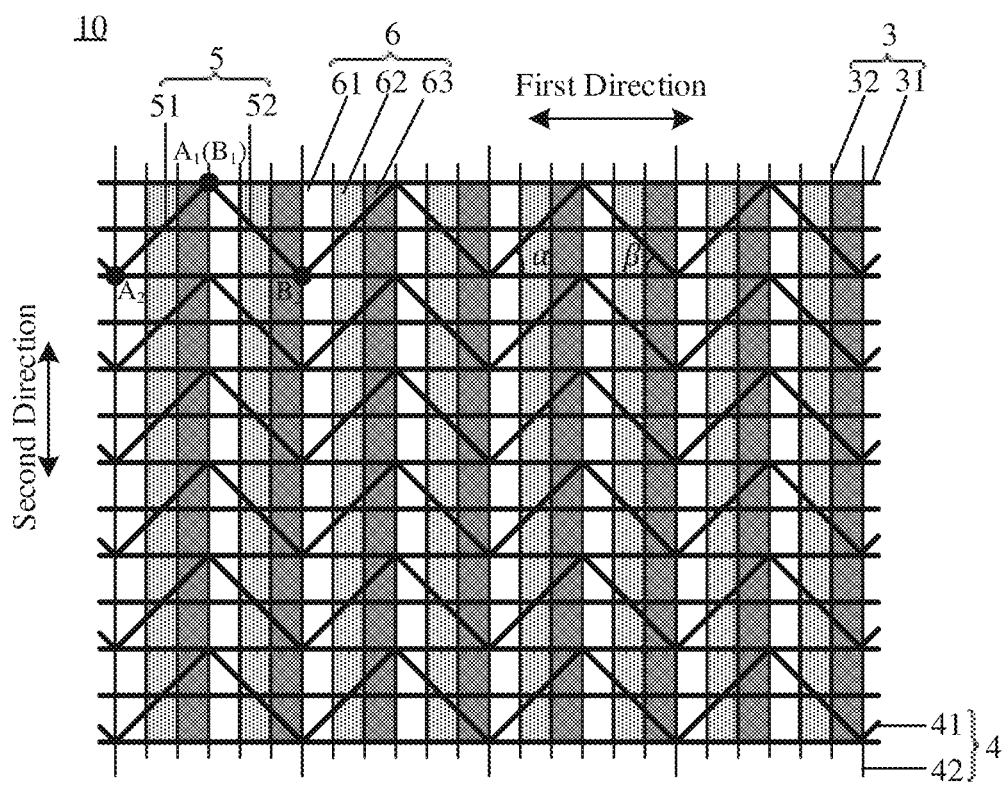
FIG. 5B is a schematic planar view 3 of the display panel provided by an embodiment of the present disclosure.

In some embodiments, at least a part of the plurality of first signal lines are fold lines, and the plurality of second signal lines are all straight lines. FIG. 5A is a schematic planar view 2 of the light control panel of the display panel in FIG. 2A. FIG. 5B is a schematic planar view 3 of the display panel provided by one embodiment of the present disclosure. For example, as shown in FIGS. 5A-5B, the plurality of first signal lines 41 are all fold lines, and the plurality of second signal lines 42 are all straight lines. This proposal can also alleviate the moire pattern while alleviating the rainbow stripe phenomenon.

Figure 2D:
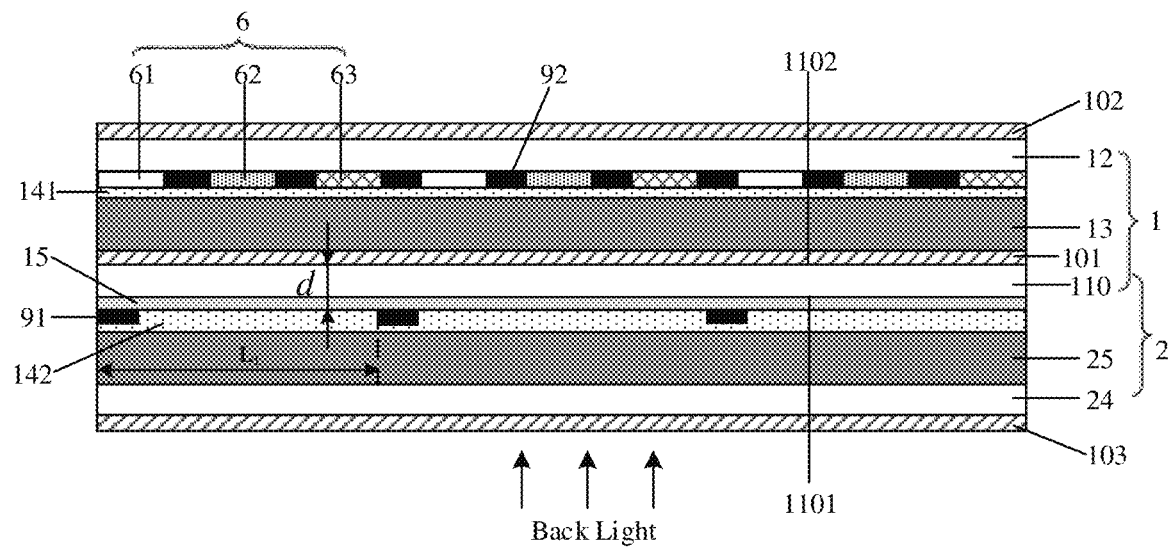
FIG. 2D is a schematic sectional view of still another display panel provided by an embodiment of the present disclosure.

FIG. 2D is a schematic sectional view of still another display panel provided by an embodiment of the present disclosure. As shown in FIG. 2D, For example, in at least one embodiment of the present disclosure, the display panel 10 further comprises an isotropic diffusion film (IDF) 15. The IDF 15 is configured to allow light adjusted by the light control panel 2 to enter the IDF 15, be subjected to isotropic diffusion, and then be incident into the liquid crystal display panel 1. For example, the IDF 15 is disposed on the first surface 1101, away from the liquid crystal display panel 1, of the common substrate 110, and is disposed on a side, close to the common substrate 110, of the first black matrix 91. The first black matrix 91 can prevent the crosstalk between adjacent light control units. Thus, the arrangement of the IDF 15 on a side, close to the common substrate 110, of the first black matrix 91 can achieve a better light control effect. For example, the IDF 15 is bonded to the first surface, away from the liquid crystal display panel 1, 1101 of the common substrate 110 by the adhesion layer, and at least has a same profile with the liquid crystal display panel 1. Or in other embodiments, for example, the IDF 15 is disposed on a second surface 1102, away from the light control panel 2, of the common substrate 110. Or in the case where the display panel 10 comprises four base substrates as shown in FIG. 2A, for example, the IDF 15 is disposed between the first base substrate 11 and the third base substrate 23. The specific position of the IDF 15 is not specifically limited, as long as the light adjusted by the light control panel 2 can enter the IDF 15, then be subjected to isotropic diffusion, and be incident into the liquid crystal display panel 1. In the embodiment of the present disclosure, the IDF 15 can allow the light adjusted by the light control panel 2 to diffuse within a small angle range, so that light emitted from the plurality of color subpixel units is relatively uniform, and then the rainbow stripes are further reduced. Meanwhile, the IDF 15 does not produce a major impact on the direction of the light emitted from the light control panel 1. Other unmentioned features of the display panel 10 as shown in FIG. 2D are all the same as those shown in FIG. 2C.

For example, as shown in FIG. 2A, the display panel 10 further comprises a second polarizer 102 and a third polarizer 103; the second polarizer 102 is on the second base substrate 12; the third polarizer 103 is on the fourth base substrate 24; and the haze of at least one selected from a group consisting of the first polarizer 101 and the second polarizer 102 is in a range of 0%~55%, which can also achieve the effect of alleviating the rainbow stripes. For example, the haze of at least one selected from the group consisting of the first polarizer 101 and the second polarizer 102 is in a range of 25%-55%. The effect of alleviating the rainbow stripes is good within this range.

At least one embodiment of the present disclosure provides a display device, and the display device comprises any one of the display panels provided by the embodiments of the present disclosure.

Figure 6:
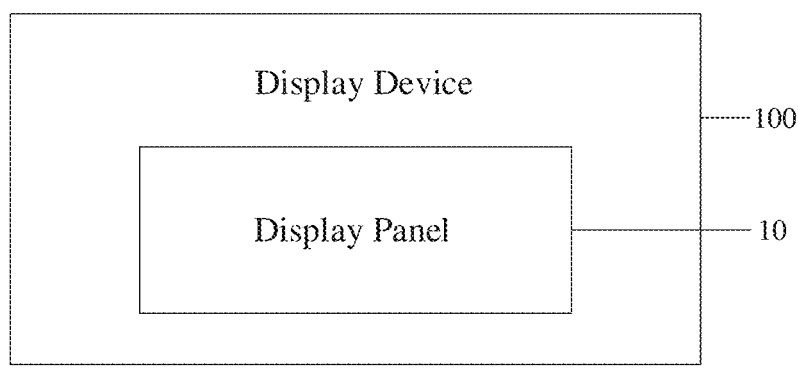
FIG. 6 is a schematic diagram of a display device provided by an embodiment of the present disclosure.

For example, FIG. 6 is a schematic diagram of a display device provided by the embodiment of the present disclosure. As shown in FIG. 6, the display device 100 comprises any one of the display panels 10 provided by the embodiments of the present disclosure. The display device 100 is a liquid crystal display device. For example, the display device may be implemented as the following product: any product or component with a display function such as a mobile phone, a tablet computer, a display, a notebook computer or an automated teller machine (ATM) machine. The display device 10 can control the direction or the intensity of the back light incident into the liquid crystal display panel 1, and can achieve the effect of eliminating or alleviating the rainbow stripes.

For example, FIG. 7 is a schematic sectional view of a display device provided by an embodiment of the present disclosure. The display device 100 further comprises a backlight unit (a backlight) 16. The backlight unit 16 is disposed on a side, away from the liquid crystal display panel 1, of the light control panel 2, so that the back light from the backlight unit can enter the light control panel 2 at first, and the back light is incident into the liquid crystal display panel 1 after the emergence angle or the intensity of the back light are adjusted by the light control panel 2 as required, for example, according to the requirement of realizing the conversion between a narrow viewing angle and a wide viewing angle, the requirement of controlling different luminous intensities at various positions of the display panel, etc. The backlight unit 16 may be a direct-lit backlight unit or a side-lit backlight unit, and no limitation is imposed to the type of the backlight unit 16 in the embodiment of the present disclosure.

What have been described above are only specific implementations of the present disclosure, the protection scope of the present disclosure is not limited thereto. Therefore, the protection scope of the present disclosure should be based on the protection scope of the claims.

What is claimed is:

1. A display panel, comprising a liquid crystal display panel, and a light control panel stacked with the liquid crystal display panel, wherein
the liquid crystal display panel comprises a plurality of mesh lines, the plurality of mesh lines comprise a plurality of first mesh lines extending along a first direction and a plurality of second mesh lines extending along a second direction, the first direction and the second direction intersect with each other, and the plurality of first mesh lines and the plurality of second mesh lines define a plurality of color subpixel units arranged in an array;
the light control panel is configured to allow back light to be incident into the liquid crystal display panel after passing through the light control panel, and the light control panel comprises a plurality of signal lines; the plurality of signal lines comprise a plurality of first signal lines extending along the first direction and a plurality of second signal lines extending along the second direction; the plurality of first signal lines and the plurality of second signal lines define a plurality of light control units continuously and periodically arranged in an array;

N color subpixel units which are continuously arranged along the first direction constitute one pixel unit, and N is a positive integer; the N color subpixel units respectively display different colors; and along the first direction, maximum lengths of the plurality of light control units are same as each other, and the maximum length of each light control unit of the plurality of light control units is m times a maximum length of one pixel unit, and m is a non-integer.

2. The display panel according to claim 1, wherein 2.00129<m<2.00157.

3. The display panel according to claim 2, wherein m=2.00143.

4. The display panel according to claim 1, wherein a size of the display panel is 65 inches, a resolution of the display panel is 4K, and along the first direction, the maximum length of each light control unit of the plurality of light control units is in a range of 744.0 μm-744.7 μm.

5. The display panel according to claim 4, wherein along the first direction, the maximum length of each light control unit of the plurality of light control units is 744.55 μm.

6. The display panel according to claim 1, wherein the size of the display panel is 75 inches, a resolution of the display panel is 4K, and along the first direction, the maximum length of each light control unit of the plurality of light control units is in a range of 859.5 μm-856.0 μm.

7. The display panel according to claim 6, wherein along the first direction, the maximum length of each light control unit of the plurality of light control units is 859.85 μm.

8. The display panel according to claim 1, wherein along the second direction, a maximum width of each light control unit of the plurality of light control units is n times a maximum width of one pixel unit, and n is a positive integer.

9. The display panel according to claim 1, wherein the liquid crystal display panel comprises:
   a first base substrate; and
   a second base substrate opposite to the first base substrate and on a side, away from the light control panel, of the first base substrate;
   the light control panel comprises:
   a third base substrate; and
   a fourth base substrate on a side, away from the liquid crystal display panel, of the third base substrate; and
   a distance between a first surface, away from the light control panel, of the first base substrate and a first surface, away from the liquid crystal display panel, of the third base substrate is less than or equal to 1.7 mm.

10. The display panel according to claim 9, wherein the first base substrate and the third base substrate are an integral structure, the integral structure constitutes a common substrate, and the liquid crystal display panel and the light control panel share the common substrate.

11. The display panel according to claim 9, further comprising:
   an adhesion layer between the first base substrate and the third base substrate to bond the first base substrate and the third base substrate so that no air layer is between the first base substrate and the third base substrate;
   a first polarizer on the first surface, away from the liquid crystal display panel, of the third base substrate, or on the first surface, away from the light control panel, of the first base substrate, wherein the distance between the first surface of the first base substrate and the first surface of the third base substrate is equal to a sum of a thickness of the first base substrate in a direction perpendicular to the first surface of the first base substrate, a thickness of the third base substrate in the direction perpendicular to the first surface of the first base substrate, and a thickness of the adhesion layer in the direction perpendicular to the first surface of the first base substrate.

12. The display panel according to claim 11, wherein a refractive index of the adhesion layer is greater than a refractive index of the first base substrate and greater than a refractive index of the third base substrate.

13. The display panel according to claim 12, wherein a difference between the refractive index of the adhesion layer and the refractive index of the first base substrate is less than 0.3; and the difference between the refractive index of the adhesion layer and the refractive index of the third base substrate is less than 0.3.

14. The display panel according to claim 1, wherein both a line width of each first signal line of the plurality of first signal lines and a line width of each second signal line of the plurality of second signal lines are less than or equal to 30 μm.

15. The display panel according to claim 1, wherein the light control panel further comprises a first black matrix covering the plurality of first signal lines and the plurality of second signal lines, and a line width of the first black matrix is less than or equal to 30 μm.

16. The display panel according to claim 1, wherein at least a part of the plurality of first signal lines includes a fold line(s) and at least a part of the plurality of second signal lines includes a fold line(s); or
   at least a part of the plurality of first signal lines includes a fold line(s), and all the plurality of second signal lines are straight lines.

17. The display panel according to claim 1, wherein the light control panel is a light control liquid crystal panel; the first signal lines are first gate lines; the second signal lines are first data lines; the first gate lines and the first data lines are configured to respectively provide first gate signals and first data signals that are used for driving liquid crystal molecules in the light control units of the light control liquid crystal panel to rotate;
   the first mesh lines are second gate lines, the second mesh lines are second data lines; the second gate lines and the second data lines are configured to respectively provide second gate signals and second data signals that are used for driving liquid crystal molecules in the color subpixel units of the liquid crystal display panel to rotate.

18. The display panel according to claim 1, wherein the light control panel is a light control liquid crystal panel; the first signal lines are first gate lines, the second signal lines are first data lines; the first gate lines and the first data lines are configured to respectively provide first gate signals and first data signals that are for driving liquid crystal molecules in the light control units of the light control liquid crystal panel to rotate; and
   the first mesh lines and the second mesh lines constitute a second black matrix.

19. The display panel according to claim 1, further comprising:
   an isotropic diffusion film (IDF) configured to allow light adjusted by the light control panel to enter the IDF, and then to be incident into the liquid crystal display panel after the light is subjected to isotropic diffusion.

20. A display device, comprising the display panel according to claim 1.

* * * * *